(12) United States Patent
Wang et al.

(10) Patent No.: US 11,803,469 B2
(45) Date of Patent: Oct. 31, 2023

(54) STORING DATA IN A LOG-STRUCTURED FORMAT IN A TWO-TIER STORAGE SYSTEM

(71) Applicant: VMware, Inc., Palo Alto, CA (US)

(72) Inventors: Wenguang Wang, Santa Clara, CA (US); Long Yang, Fremont, CA (US); Maxime Austruy, Pully (CH); Matthew B. Amdur, Cambridge, MA (US); Eric Knauft, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/410,673

(22) Filed: Aug. 24, 2021

(65) Prior Publication Data

US 2023/0064693 A1 Mar. 2, 2023

(51) Int. Cl.
*G06F 12/0804* (2016.01)
*G06F 12/1009* (2016.01)
*G06F 16/22* (2019.01)

(52) U.S. Cl.
CPC ...... *G06F 12/0804* (2013.01); *G06F 12/1009* (2013.01); *G06F 16/2246* (2019.01); *G06F 2212/1032* (2013.01)

(58) Field of Classification Search
CPC ............ G06F 12/0804; G06F 12/1009; G06F 16/2246; G06F 2212/1032
See application file for complete search history.

(56) References Cited

U.S. PATENT DOCUMENTS

| | | | |
|---|---|---|---|
| 11,144,394 B1* | 10/2021 | Wang | G06F 11/1004 |
| 2009/0034377 A1* | 2/2009 | English | G06F 3/0613 |
| | | | 369/47.13 |
| 2011/0035359 A1* | 2/2011 | Bendakovsky | G06F 11/1469 |
| | | | 707/E17.007 |
| 2011/0246503 A1* | 10/2011 | Bender | G06F 16/258 |
| | | | 707/769 |
| 2013/0346725 A1* | 12/2013 | Lomet | G06F 12/10 |
| | | | 711/206 |
| 2017/0277438 A1* | 9/2017 | Gole | G06F 3/0689 |
| 2020/0293506 A1* | 9/2020 | Gupta | G06F 16/24568 |
| 2021/0034520 A1* | 2/2021 | Davenport | G06F 12/0804 |

\* cited by examiner

*Primary Examiner* — Sean D Rossiter
(74) *Attorney, Agent, or Firm* — Barta, Jones & Foley, PLLC

(57) ABSTRACT

The disclosure herein describes storing data using a capacity data storage tier and a smaller performance data storage tier. The capacity data storage tier includes capacity data storage hardware configured to store log-structured leaf pages (LLPs), and the performance data storage tier includes performance data storage hardware. A virtual address table (VAT) includes a set of virtual address entries referencing the LLPs. A tree-structured index includes index nodes referencing the set of virtual address entries of the VAT. Data to be stored is received, and at least a first portion of metadata associated with the received data is stored in the LLPs using the VAT, and at least a second portion of metadata associated with the received data is stored in the performance data storage tier. The architecture reduces space usage of the performance data storage tier.

20 Claims, 9 Drawing Sheets

STORING DATA IN A LOG-STRUCTURED FORMAT IN A TWO-TIER STORAGE SYSTEM

BACKGROUND

Modern, large-scale computer data storage systems often use different tiers of hardware that have different cost and performance characteristics. High performance devices are relatively expensive with smaller data capacity while lower performance devices are less expensive but enable storage of larger quantities of data. In such systems, managing storage of data between different types of hardware in an efficient way presents significant challenges. For instance, it is desirable to store metadata of the storage system in higher performance hardware, but in many cases, the system includes insufficient capacity in the higher performance hardware to store all such metadata.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for storing data using a capacity data storage tier and a performance data storage tier is described. A capacity data storage tier including capacity data storage hardware configured to store log-structured leaf pages (LLPs) is configured and managed. A performance data storage tier including performance data storage hardware is configured and managed. A virtual address table (VAT) including a set of virtual address entries is defined for use with the capacity and performance data storage tiers, wherein the virtual address entries include references to the LLPs. A tree-structured index including a set of index nodes is defined for use with the capacity and performance data storage tiers, wherein a subset of index nodes of the tree-structured index include references to the set of virtual address entries of the VAT. The performance data storage hardware has a lower data storage capacity than the capacity data storage hardware and the performance data storage hardware has a faster data rate than the capacity data storage hardware.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 8, the systems are illustrated as schematic drawings. The drawings may not be to scale.

DETAILED DESCRIPTION

Figure 1:
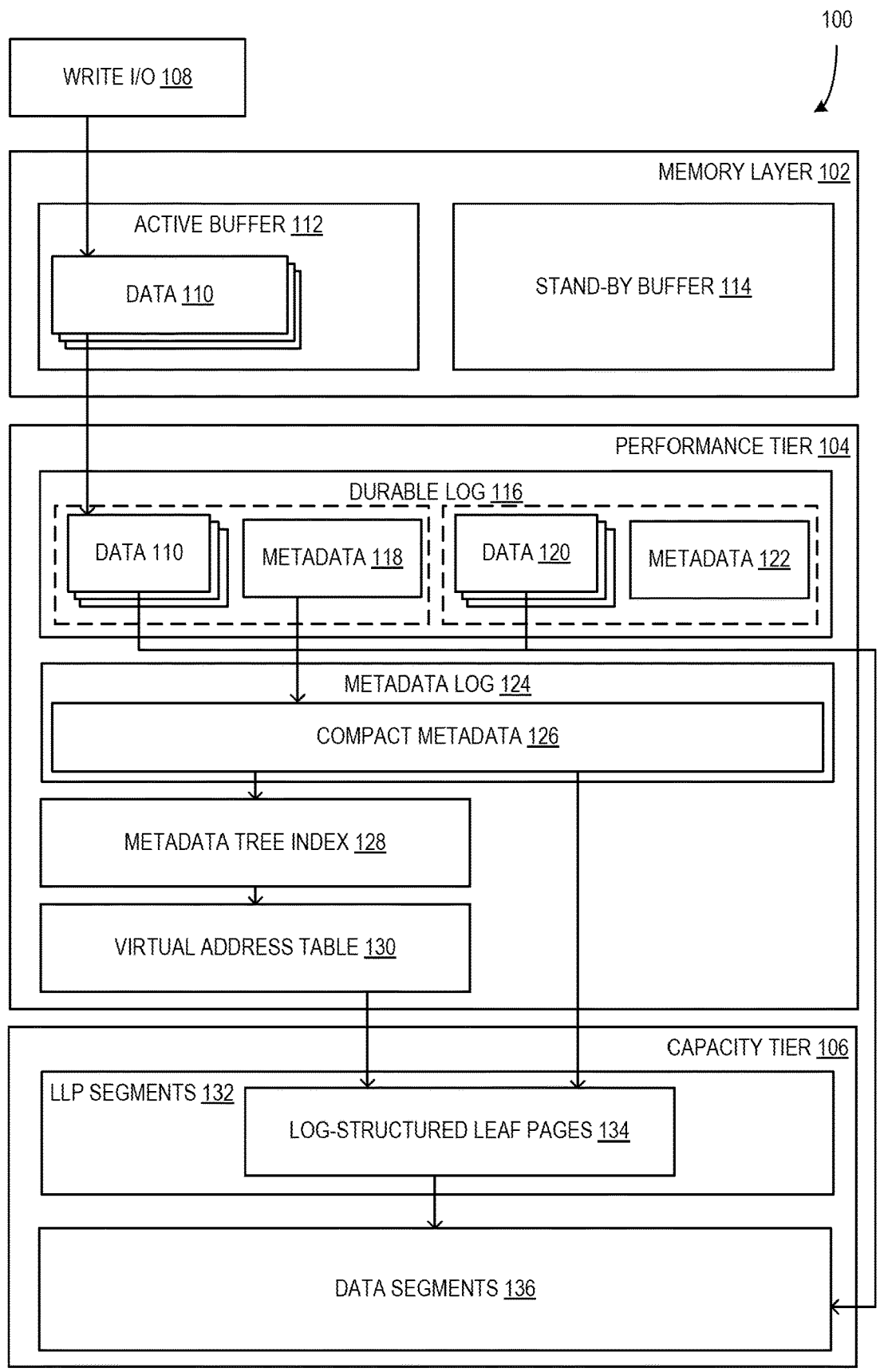
FIG. 1 is a block diagram illustrating a two-tier data storage system configured for storing log-structured leaf pages using a virtual address table (VAT)

Aspects of the disclosure provide a computerized method and system for storing data using a capacity data storage tier and a performance data storage tier, including storing log-structured leaf pages in the capacity data storage tier while providing abstracted references to those log-structured leaf pages using a virtual address table (VAT) in the performance data storage tier. Using log-structured leaf pages (LLPs) enables those pages to be efficiently stored and managed on capacity tiers that are configured for and/or require log-structured data storage methods (e.g., writing data sequentially in large segments, using Copy on Write (COW), etc.). The tree-structured index in the performance tier enables the system to efficiently locate leaf pages although the locations of the leaf pages in the capacity tier change whenever they are updated. Managing and making changes to such a tree-structured index is complex, resource intensive (e.g., the tree structure is recalculated based on even a minor change), and a generic tree structure cannot be leveraged. The disclosure operates in an unconventional manner at least by inserting a VAT as a level of abstraction, indirection, and/or translation between the leaf pages and the nodes of the tree-structured index, such that changes to locations of the leaf pages only require changing the references to those leaf pages in the entries of the VAT, which substantially reduces the complexity and frequency with which the tree-structured index must be updated.

Configuration and management of the VAT includes processes for handling the flushing of leaf page cache entries in memory to the capacity tier, processes for locating specific LLPs in the capacity tier to read leaf page data thereon, processes for handling changes of LLP location in the capacity tier based on management processes of that storage system, and/or processes for allocating or freeing LLPs and associated entries in the VAT.

The disclosure provides a solution to the issue of insufficient space on the performance tier of the described two-tier storage system that involves only relatively small adjustments of the VAT and configuring the system to work with the VAT. Such changes to a system (e.g., VMWARE ZDOM systems) allow metadata to be efficiently handled where the capacity of the performance tier is only a small fraction (e.g., 1/524) of the capacity of capacity tier. The disclosure provides a modular design that reduces user efforts for implementation.

Further, the disclosure takes advantage of the performance capabilities of the performance tier while reducing the quantity of performance hardware that is needed, thereby reducing costs of the system and improving the functioning of the underlying device. The metadata to be stored on the performance tier is mostly in the index pages or nodes of the tree-structured index, which are small enough to fit in the performance tier.

Additionally, formatting the leaf pages as log-structured leaf pages makes them compatible with the capacity tier and the rest of the system. This simplifies the design of the other portions of the system, such as relatively more complex B-tree modules or other tree structures. Further, the system efficiently manages resources of the computing architecture, such as through the use of the VAT and LLPs as described herein, to improve the functioning of the underlying devices.

FIG. 1 is a block diagram illustrating a two-tier data storage system 100 configured for storing LLPs 134 using a VAT 130. In some examples, the system 100 includes a memory layer 102, a performance tier 104 of data storage, and a capacity tier 106 of data storage. The example system 100 is installed on, located on, or otherwise executed on one computing device or on multiple computing devices that are in communication with each other (e.g., connected over a computer network). For instance, the memory layer 102 is located on one computing device, the performance tier 104 is located on a first set of server devices, and the capacity tier 106 is located on a second set of server devices. In some examples, the system 100 uses VMWARE ESX servers for memory of the memory layer 102 and storage arrays of VMWARE VSAN for the performance tier 104 and the capacity tier 106.

In some examples, the system 100 receives write I/Os 108 at the memory layer 102. The data 110 of the write input/output messages (I/Os) 108 (e.g., data to be written to and stored in the data storage system 100) is initially recorded in an active buffer 112 of the memory layer 102. Further, the memory layer 102 is configured to include one or more other buffers, such as a stand-by buffer 114 that is activated when the active buffer 112 is full and/or flushing data to the performance tier 104 (e.g., the stand-by buffer 114 records write I/Os 108 when the active buffer 112 is occupied with flushing data to the performance tier 104). The active buffer 112 of the memory layer 102 is triggered to flush data 110 to the performance tier 104 based on the active buffer 112 reaching a data threshold (e.g., the active buffer 112 storing more than 512 kilobytes (KB) of data and/or more than 75% of the buffer's capacity) and/or based on passage of a defined time period (e.g., flushing of the active buffer 112 may be triggered if it has not been flushed for 2 minutes), or other threshold. If the active buffer 112 is being flushed, the stand-by buffer 114 is activated and configured to receive write I/Os 108 while the active buffer 112 is being flushed.

In some examples, when the data 110 is flushed to the performance tier 104, it is stored in a durable log 116 with metadata 118 associated with the data 110. The metadata 118 includes data used to identify, classify, or otherwise describe the data 110 with which it is associated. The durable log 116 is configured to store multiple sets of data 110 and 120 and corresponding metadata 118 and 122 up to a defined storage capacity of the durable log 116. Metadata on the durable log 116 (e.g., metadata 118 and 122) is stored as compact metadata 126 in a metadata log 124 in the performance tier 104 as well, such that it can be processed to be used in a variety of ways as described herein. The system 100 is further configured to monitor data in the durable log 116 and trigger flush operations to flush the data of the durable log 116 from the performance tier 104 into the data segments 136 of the capacity tier 106. Such example flush triggers include the quantity of data stored in the durable log 116 reaching a defined threshold (e.g., the stored data reaches a quantity that enables a full stripe write to a redundant array of independent disks (RAID) of the capacity tier 106) and/or the data in the durable log 116 reaching a defined age threshold (e.g., the time that has passed since the data was written to the durable log 116 from the memory 102). Other flush triggers may also be used.

In some examples, the compact metadata 126 in the metadata log 124 is processed or otherwise transformed to generate a metadata tree index 128, a VAT 130, and associated LLPs 134 as described herein. The metadata tree index 128 is configured as a B-tree or other similar tree structure that enables the efficiently searching of metadata to identify a location of data in the capacity tier 106. For instance, the metadata tree index 128 is configured to organize data location address metadata such that the tree index 128 can be searched efficiently for any particular data location address. It should be understood that the LLPs 134 represent the leaf nodes of branches of the tree index 128, such that the LLPs 134 include the specific location data used to locate data in the capacity tier 106. However, the VAT 130 is included between the metadata tree index 128 and the LLPs 134. The VAT 130 works as an abstraction layer, an indirection layer, and/or a translation layer configured to enable efficient interaction between the nodes of the tree index 128 and the LLPs 134 and to reduce the quantity of rewrites to the tree index 128, which can be complex and resource-intensive. Further, the LLPs 134 represent a significant quantity of the total metadata being stored and processed and storing those leaf pages 134 in a log-structured manner on the capacity tier 106 avoids the issue of lack of capacity on the performance tier 104 and even frees up capacity on the performance tier 104 for other uses. This improves the functioning and/or operation of the underlying device. The details of the VAT 130 and its interactions with other portions of the system 100 are described in greater detail below.

In some examples, the capacity tier 106 includes LLP segments 132 (e.g., configured to store the LLPs 134) and data segments 136 (e.g., configured to store the data from the write I/Os received by the system 100 (e.g., data 110 and 120). The capacity tier 106 is configured to receive such data in relatively large segments and to record the data using log-structured principles. For example, a set of data that includes 64 KB of data is written to a single new segment location in the data segments 136 if it is data and/or in the LLP segments 132 if it is a set of LLPs 134. The data segment is appended to the data segments 136 in one piece. Any data addresses, offsets, or locations that would be changed by the newly recorded data segment are then de-referenced in older data segments 136 and those references are re-established with the newly recorded data segment 136. The LLPs 134 of the LLP segments 132 are recorded in substantially the same way as described herein. Such log-structured data storage techniques enable quick and efficient writing or recording of data in large batches.

In some examples, the performance tier 104 is configured to include data storage hardware that has substantially faster data rates (e.g., rate of reading and/or writing data) than the capacity tier 106, but that performance data storage hardware also stores less data and is more expensive per data quantity stored. For instance, the performance tier 104 is configured to use INTEL OPTANE data storage while the capacity tier 106 is configured to use QLC Solid State Disk (SSD) data storage. In such examples, the hardware of the performance tier 104 is limited to smaller size (e.g., 375 gigabytes (GB)) but it may be ~10 times faster than the hardware of the capacity tier 106. The hardware of the capacity tier 106 may be much larger (e.g., up to 64 terabytes (TB)) and less expensive (e.g., 4 times less expensive per GB), but it may be much slower and require large data writes (e.g., ~64 KB) to operate efficiently. The tiers 104 and 106 are configured to operate with a defined ratio of performance tier 104 storage to capacity tier 106 storage, such as two hardware units of performance tier 104 storage to 6-8 hardware units of capacity tier storage 106. This configuration therefore limits the quantity of performance tier 104 storage space that is available to store metadata associated with the storage space in the capacity tier 106 (e.g., a configuration where performance tier 104 units have only 8 bytes of space per each 4 KB block of space on the capacity tier 106).

Further, in some examples, the LLPs 134 include metadata that reference blocks or other units of data in the data segments 136. Thus, the process for accessing a particular block of data in the data segments 136 includes searching for an address associated with the block of data in the metadata tree index 128, identifying a reference to a virtual address entry of the VAT 130 in a node of the metadata tree index 128, identifying a reference to an LLP 134 in the identified virtual address entry, and then determining a location of the block of data using the value recorded in the virtual address entry. In other examples, other data access techniques may be used without departing from the description.

Although the LLPs 134 are located on the relatively slow capacity data storage tier, in many cases, the leaf pages that are being accessed are cached in memory (e.g., the memory layer 102), such that slowdowns from accessing the capacity data storage tier are avoided. Further, reading from the capacity data storage tier due to an occasional cache miss may only affect the performance of the system in a limited way. Further, since the metadata are stored together in large segments in the capacity data storage tier, the spatial locality of those metadata enhance the rate at which an entire segment can be loaded into memory, after which the metadata of the segment can be accessed efficiently.

Additionally, in some examples, the data stored in the system 100 is stored using one or more RAID organizations (e.g., RAID-1, RAID-6, etc.). In such examples, the segments that are written to the capacity data storage tier 106 are units of storage space where error correction of corrupted data can happen on a RAID group of devices if the number of errors is less than or equal to the pre-defined parity of the RAID group. As a result, the size of each segment is dependent on the type of RAID configuration and/or the configuration and/or requirements of the hardware of the capacity tier 106.

Figure 2A:
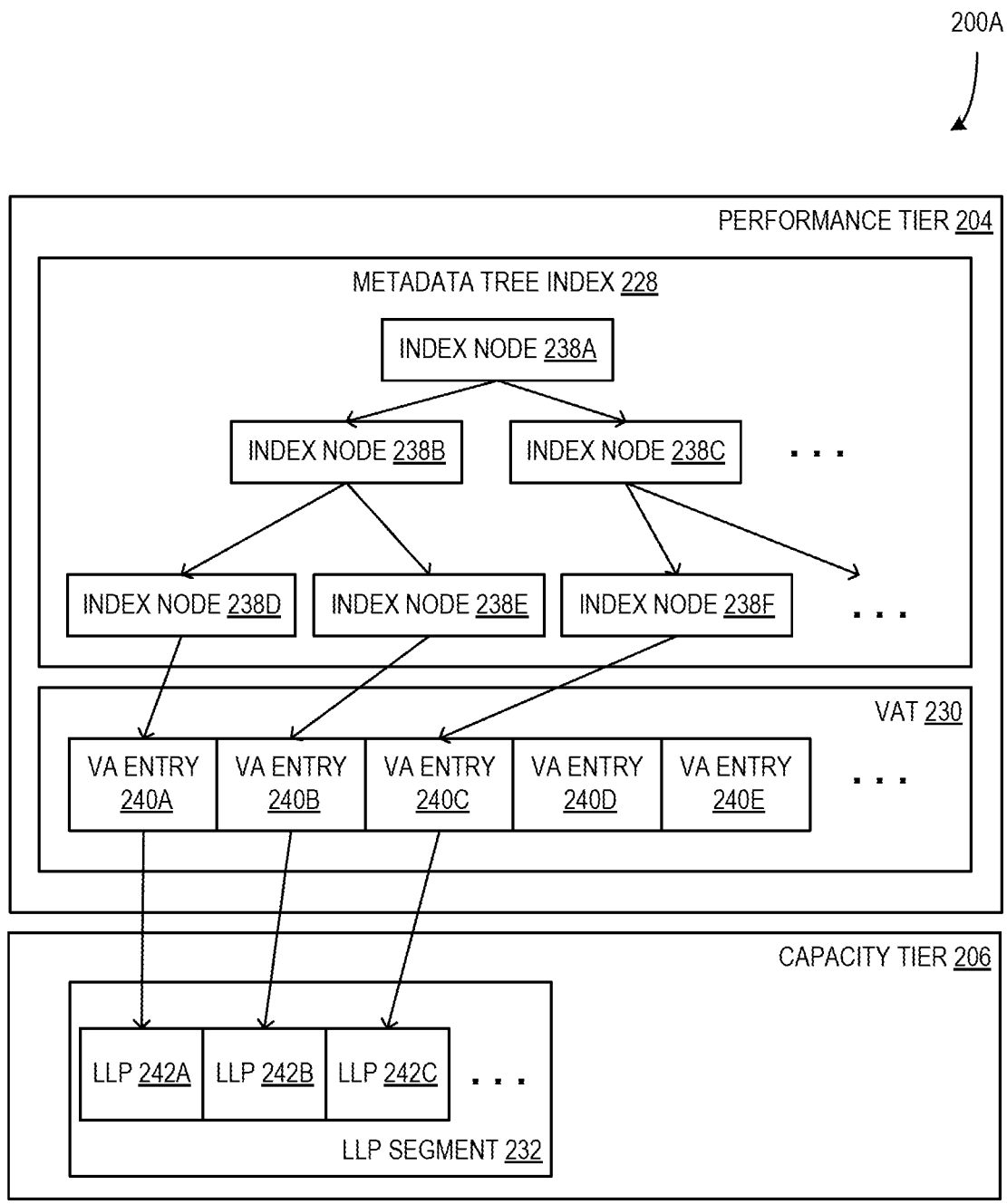
FIG. 2A is a block diagram illustrating a two-tier data storage system configured with a VAT of virtual address entries referencing log-structured leaf pages.

FIG. 2A is a block diagram illustrating a two-tier data storage system 200A configured with a VAT 230 of virtual address entries 240A-E referencing log-structured leaf pages 242A-C. In some examples, the performance tier 204 and capacity tier 206 of the system 200A are part of a system such as system 100 of FIG. 1 as described herein.

The performance tier 204 includes a metadata tree index 228 and a VAT 230. As illustrated, the metadata tree index 228 includes a set of index nodes 238A, 238B, 238C, 238D, 238E, and 238F. It should be understood that, in other examples, the metadata tree index 228 includes more, fewer, or differently arranged index nodes without departing from the description. For instance, each level of the metadata tree index 228 has more and/or different nodes included therein and/or the metadata tree index 228 includes more or different levels of the tree structure. Further, in some examples, the metadata tree index 228 is configured and managed as a B-tree, such that searches, sequential access, insertions, and deletions can be performed in logarithmic time (e.g., O (log n)). Such a configuration allows for nodes with more than two children. In other examples, the metadata tree index 228 is configured and managed as a different type of tree data structure without departing from the description.

Further, each of the index nodes 238A-F references or otherwise points to one or more other index nodes or to a virtual address (VA) entry 240A-E. For instance, index node 238D points to VA entry 240A, index node 238E points to VA entry 240B, and index node 238F points to VA entry 240C. The VA entries 240A-E function as a layer of abstraction between the index nodes 238D-F and the LLPs 242A-C, which may otherwise act as the deepest layer of the metadata tree index 228 structure. The index nodes 238A-F and the LLPs 242A-C are configured such that every search of the metadata tree index 228 results in a path being traced all the way down the tree structure to arrive at one of the LLPs 242A-C. The index nodes 238A-F are configured to only include metadata that is used to traverse the tree structure to an appropriate leaf page 242A-C and those leaf pages are configured to include the metadata that is being sought by the search operation (e.g., a location or other access information of one or more data blocks stored in the capacity tier 206).

In some examples, the VAT 230 includes a series of VA entries 240A-E that are referenced by an entry identifier (ID), address or the like and that are configured to include a reference (e.g., a physical offset) to an LLP 242A-C in an LLP segment 232 on the capacity tier 206. The VAT 230 further includes other data and/or metadata that is used to manage the operations of the VAT 230, which are described in greater detail below with respect to FIG. 3. The VAT 230 includes a set number of VA entries 240A-E and/or the VAT 230 is dynamically expanded to include more VA entries 240A-E or contracted to include fewer VA entries 240A-E as needed. The VAT 230 is configured to start with a default number of VA entries 240A-E that it can use and/or reuse to connect index nodes 238 of the metadata tree index 228 to LLPs 242 on the capacity tier 206. The VAT 230 is updated and/or otherwise managed to account for changes made to the LLPs 242 based on their log-structured nature, thereby preserving the structure of the metadata tree index 228, as changing such a tree structure can be complex and resource intensive. Such a change to the LLPs 242 and the associated VAT 230 is illustrated in FIG. 2B and described below with respect to FIG. 2B.

Figure 2B:
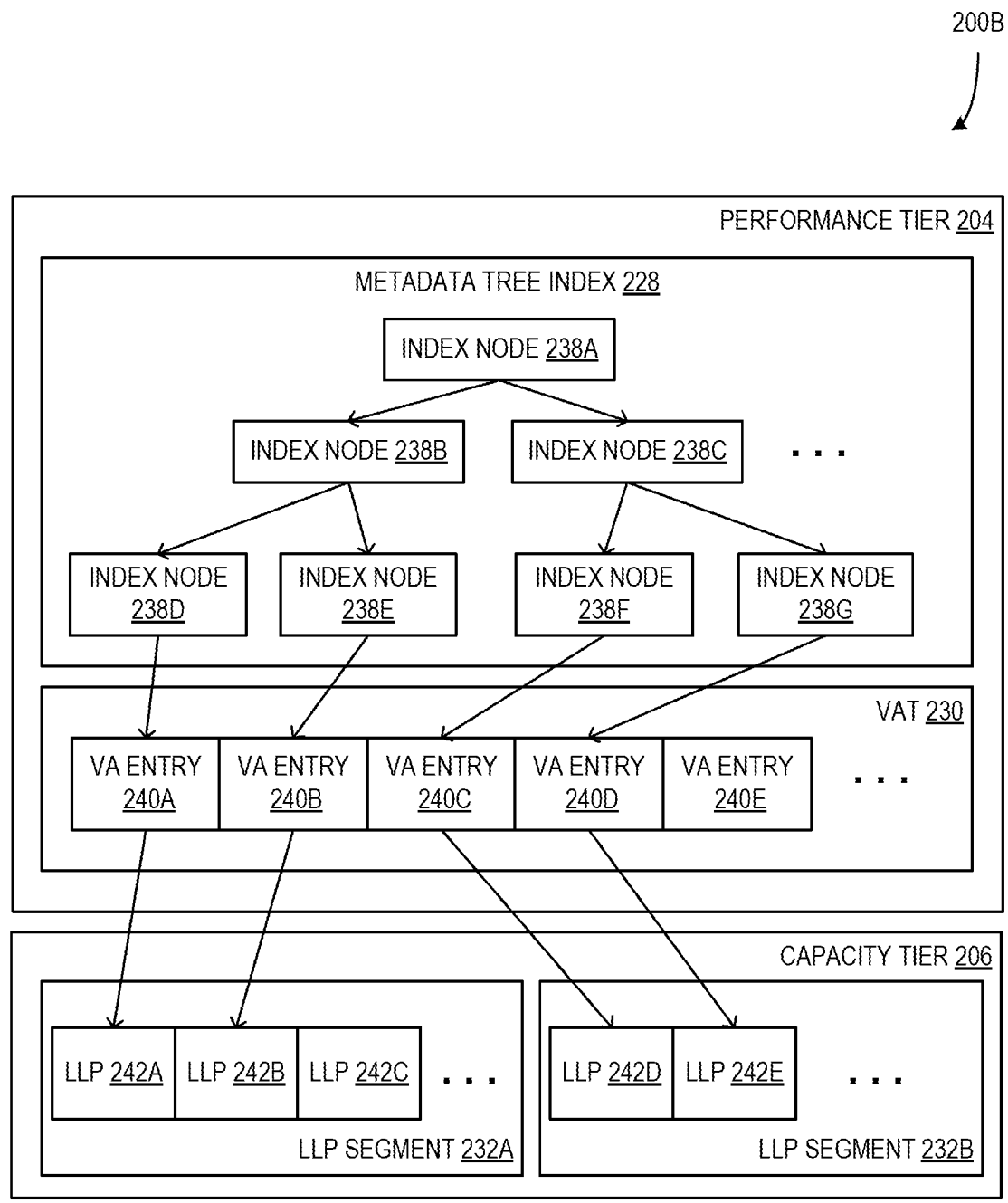
FIG. 2B is a block diagram illustrating the two-tier data storage system of FIG. 3 after a new log-structured leaf page segment is created.

FIG. 2B is a block diagram illustrating the two-tier data storage system 200A of FIG. 2A as system 200B after a new log-structured leaf page segment 232B is created. In some examples, the system 200B is the same as system 200A of FIG. 2A and is part of a system such as system 100 of FIG. 1. Changes to system 200B from 200A may reflect the results of a flush operation of data from memory and/or a performance tier 204 log to the capacity tier 206 and the updating of the metadata associated therewith.

As a result of the changes to the system 200B, an index node 238G now references the VA entry 240D of the VAT 230. The index nodes 238D, E, and F still reference VA entries 240A, B, and C, respectively, as previously shown in FIG. 2A. Thus, the structure of the metadata tree index 228 has only slightly changed due to the flush operation.

Further, an LLP segment 232B has been added to the capacity tier 206, and it is appended to the tier 206 after the LLP segment 232A, which is the segment 232 of FIG. 2A. The references of VA entries 240A and B to LLPs 242A and B, respectively, remain unchanged, as the data being written by the flush operation does not overwrite those leaf pages. However, the VA entry 240C now references LLP 242D of LLP segment 232B instead of LLP 242C of LLP segment 232A. In this case, the LLP 242C has been changed based on the current flush operation. Because the LLPs are log-structured, they are not overwritten in place when changes are made. Rather, a new version of a changed LLP is written in a new segment and the reference to the old version is moved to the new version. In this case, the reference in the VA entry 240C is changed from a reference to LLP 242C to a reference to LLP 242D after the new LLP segment 232B is written to the capacity tier 206.

Additionally, the LLP segment 232B includes an LLP 242E that is referenced by the newly used VA entry 240D. Such a new LLP may be the result of new data being written to the system that occupies address space that was not previously in use. However, there may be other reasons for a new LLP to be introduced that are within the scope of the description.

In some examples, the system 200B is configured to manage the LLP segments 232 of the capacity tier 206 in order to ensure efficient use of the data capacity of the tier 206 and to prevent excess buildup of old, unreferenced LLPs. The system 200B monitors the usage of a segment, such as by monitoring the number or percentage of LLPs therein that are referenced by a VA entry 240 of a VAT 230, in some examples. When an LLP segment 232 is first written to the capacity tier 206, the LLPs 242 therein should be 100% referenced by VA entries 240 of a VAT 230 at that point or shortly thereafter (setting the references of the VA entries may take some amount of time after the segment is written). However, after some time has passed and more LLP segments 232 have been written to the capacity tier 206, the number of referenced LLPs in an older segment 232 is likely to be reduced as changes are made to the LLPs stored therein and new versions of those LLPs are written in newer segments.

In some cases, when the usage of a segment 232 falls below a defined threshold, the system 200B is configured to combine several segments 232 that have low usage values into new segments that have higher usage values. For instance, if the threshold is 50% and two older LLP segments 232 fall below 50% usage, the system 200B combines the referenced LLPs 242 in those two older LLP segments 232 into a single new LLP segment 232 with 100% usage. Other thresholds and combinations of segments may also be used, such as identifying three segments 232 with less than 66% usage and combining the referenced LLPs of those segments into two new segments 232 with close to 100% usage each. Older LLP segments 232 with 0% usage may then be cleared from the storage to make room for new segments in the future.

Such reconfigurations of the LLPs 242 in the LLP segments 232 of the capacity tier 206 may result in changes being made to the VA entries 240 of VATs 230 that reference those LLPs 242. However, such changes should not reach the metadata tree index 228 due to the level of abstraction provided by the VAT 230 (e.g., a change of location of an LLP 242 causes a change in the reference included in the VA entry 240, but an index node 238 referencing that VA entry 240 need not change at all).

Figure 3:
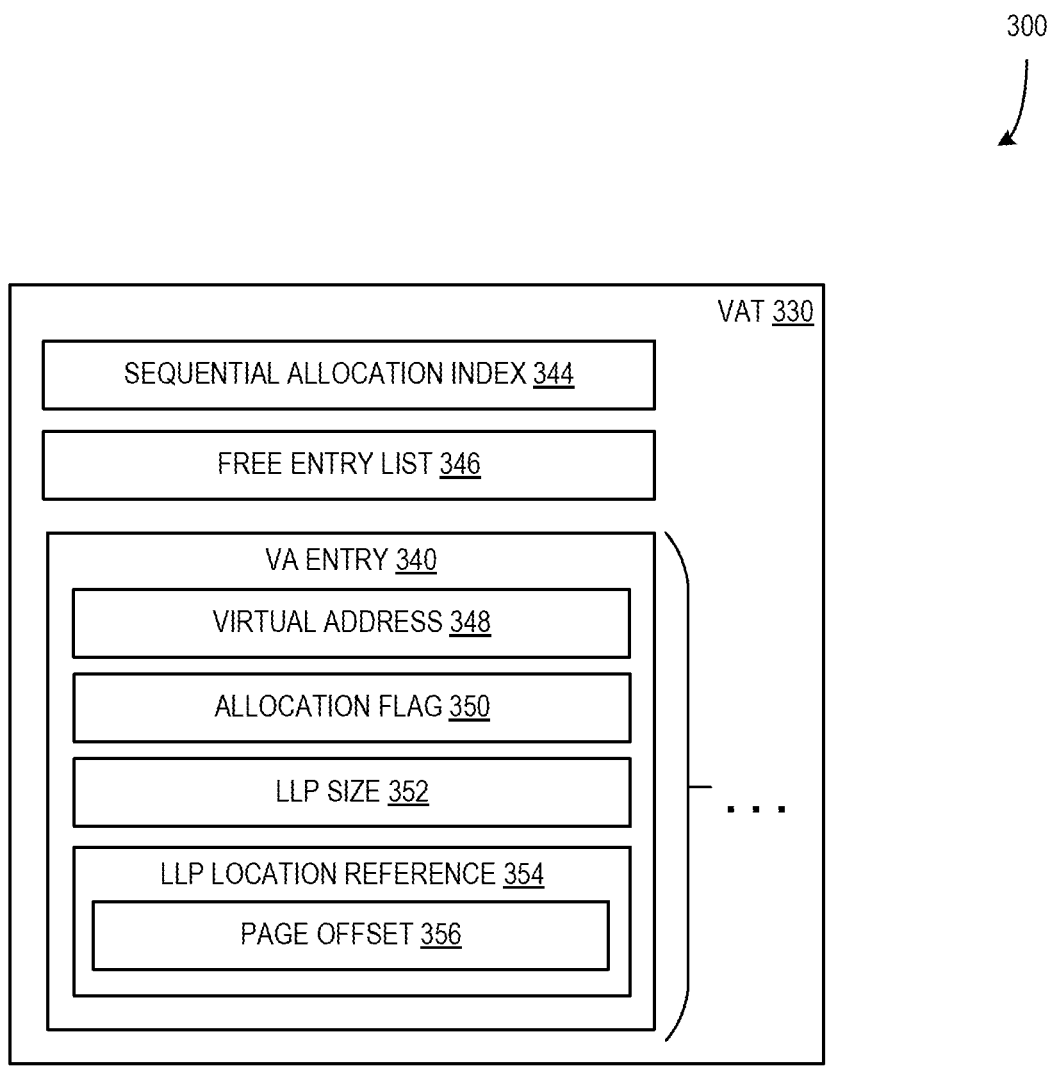
FIG. 3 is a block diagram illustrating a VAT and virtual address entries therein.

FIG. 3 is a block diagram 300 illustrating a VAT 330 and virtual address entries 340 therein. In some examples, the VAT 330 and associated VA entries 340 are part of a system such as systems 100, 200A, and 200B of FIGS. 1, 2A, and 2B, respectively. As shown, the VAT 330 includes a sequential allocation index 344 and a free entry list 346 configured to enable efficient allocation of VA entries 340. When the VAT 330 is first created or initialized, none of the VA entries 340 have been allocated and the sequential allocation index 344 includes the smallest virtual address 348 of all of those VA entries 340 (e.g., in sequential order). While the sequential allocation index 344 includes at least one virtual address 348, it is used to determine the next VA entry 340 to be allocated when a request for a VA entry allocation is received or obtained.

Further, in some examples, if the quantity of VA entries 340 in the VAT 330 is ever expanded during operation, the newly added VA entries 340 are added to the range of virtual addresses that can be allocated by sequential allocation index 344, such that they are allocated for use as requests are received or obtained.

In an example, a sequential allocation index 344 of a new VAT 330 includes the smallest virtual address 348 of four VA entries 340 of [1, 2, 3, 4], which is 1. The VAT 330 has a valid virtual address range of 1 to 4. When a VA entry 340 is allocated, the VAT 330 selects the virtual address in the sequential allocation index 344 (e.g., the '1' value) and allocates the associated VA entry 340 for use. That sequential allocation index 344 is changed to next available virtual address which is 2. When the next request for allocation of a VA entry 340 is received or obtained, the VAT 330 allocates the VA entry 340 associated with virtual address 348 '2' and sequential allocation index is changed to 3. VA entries 340 are allocated in this manner until the sequential allocation index 344 reaches beyond the largest possible virtual address value of the VAT 330, which is when the virtual address is changed to be beyond '4', the highest virtual address in the valid virtual address range, in this example.

After the sequential allocation index 344 reaches beyond its largest possible value, the free entry list 346 is used. In some examples, the free entry list 346 is configured and managed as VA entries 340 that have been allocated become free. The free entry list 346 is configured to operate as a singly linked list, stack, or other similar structure. When a VA entry 340 becomes free, it is appended or otherwise added to the head of the list. If a VA entry 340 being added to the free entry list 346 is the first or only VA entry 340 to be added, that VA entry 340 is set as the first, or head, entry in the list. If another VA entry 340 is present in the free entry list 346 when a recently freed VA entry 340 is added, a link to the current head entry of the list 346 is formed from the newly added VA entry 340 and the newly added VA entry 340 is set as the new "head entry".

Further, when a VA entry 340 is allocated from the free entry list 346, the head entry in the list is used. If the current head entry in the list 346 has a reference to a next entry, that next entry is then set as the new head entry of the list 346. For instance, if the free entry list 346 includes addresses as follows: [4, 2, 3, 1], when allocating from the list 346, the '4' address is used to allocate the associated VA entry 340 and the '2' address entry is set as the new head entry, resulting in a list 346 that includes [2, 3, 1]. Later, if a VA entry 340 with a '5' address is freed, it is added to the list 346 at the head, such that the '5' address references the '2' address as a next entry and the '5' address is set as the head entry of the list 346: [5, 2, 3, 1]. It should be understood that, in other examples, other methods of allocation of VA entries 340 from a VAT 330 may be used.

In some examples, the VA entries 340 of the VAT 330 include a virtual address 348, an allocation flag 350, an LLP size 352, and an LLP location reference 354 that includes a page offset 356. The segment index can be calculated from the physical address, by dividing the physical address by the segment size. The virtual address 348 of a VA entry 340 is configured to specifically and/or uniquely identify the VA entry 340 and/or enable the VAT 330 and/or other elements of system to access and/or interact with the specific VA entry 340. For instance, an index node that references a VA entry 340 includes a reference to the virtual address 348 of the VA entry 340.

Further, an allocation flag 350 of a VA entry 340 is configured to indicate whether the VA entry 340 is allocated or free at any given time. When a VA entry 340 is initialized, the allocation flag 350 may be set to '0' or otherwise indicate that the VA entry 340 is not yet allocated. When a VA entry 340 is allocated for use as described herein, the allocation flag 350 is set to '1' or otherwise set to indicate that the VA entry 340 is allocated. The allocation flag 350 of a VA entry 340 is accessed and/or used to determine whether the entry is free to be allocated or not.

In some examples, the LLP size 352 value of a VA entry 340 indicates a size of the LLP that is referenced by the VA entry 340. This LLP size 352 is used by the VAT 330 and/or other elements of the system to determine a quantity of data to read from the capacity tier when accessing the referenced LLP.

Further, the referenced LLP is referenced by an LLP location reference 354 that includes a page offset 356. In some examples, the LLP location reference 354 uses the page offset 356 value to identify a location in the data storage space of the capacity tier at which the referenced LLP is located. In other examples, the LLP location reference 354 includes other data in addition to the page offset 356 (e.g., a segment ID) that indicates an offset location within the storage space of the capacity tier. Other methods of referencing an LLP by a VA entry 340 may be used.

Figure 4:
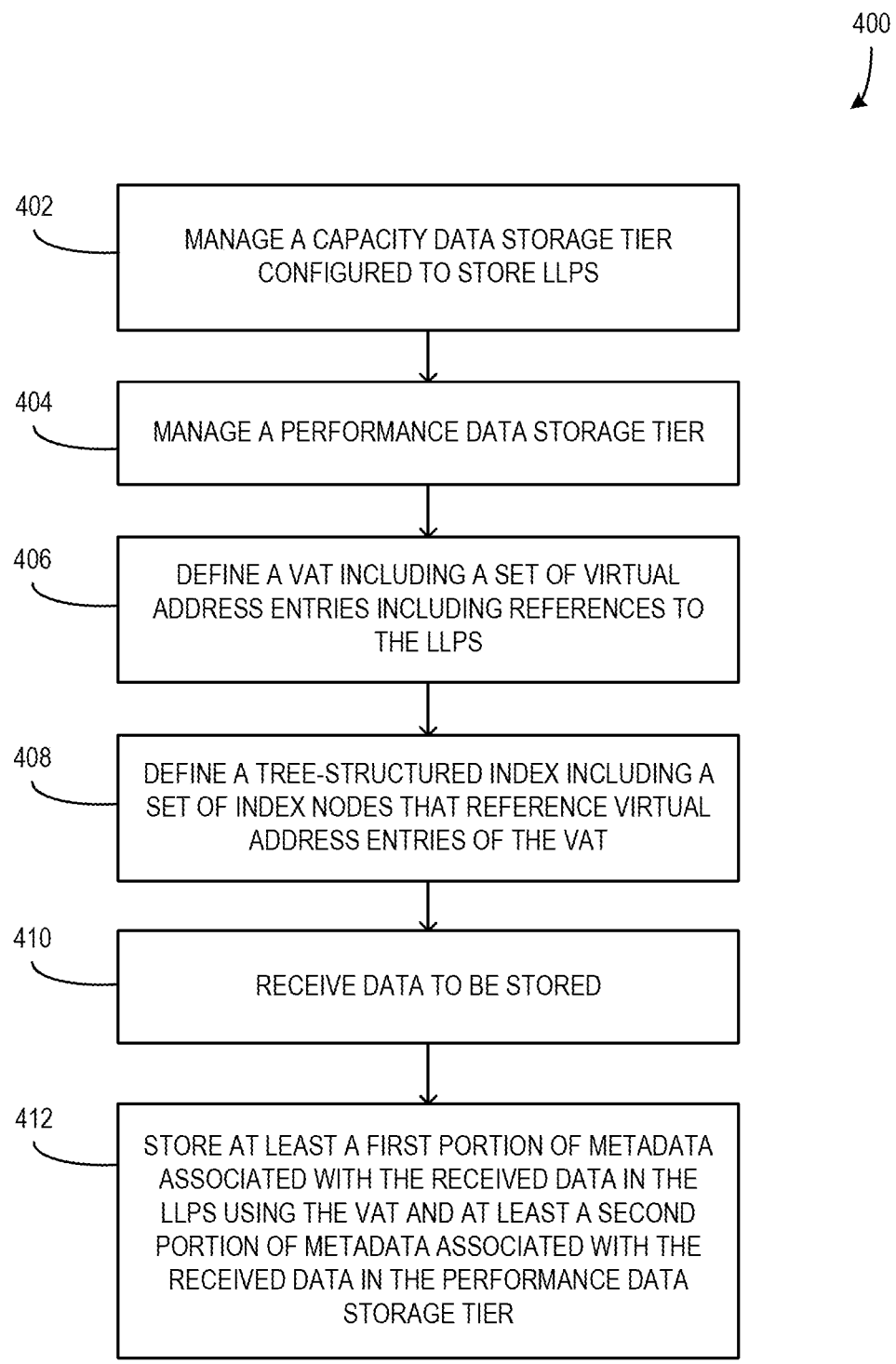
FIG. 4 is a flowchart illustrating a computerized method for storing data using a capacity data storage tier and a performance data storage tier.

FIG. 4 is a flowchart illustrating a computerized method 400 for storing data (e.g., metadata 118) using a capacity data storage tier 106 and a performance data storage tier 104. In some examples, the method 400 is executed or otherwise performed on and/or by a system such as system 100 of FIG. 1. At 402, a capacity data storage tier configured to store LLPs is managed and at 404, a performance data storage tier is managed. The performance data storage tier is configured to include performance data storage hardware and the capacity data storage tier is configured to include capacity data storage hardware, wherein the performance data storage hardware has a lower data storage capacity than the capacity data storage hardware and the performance data storage hardware has a faster data rate (e.g., a rate at which data is written to and/or read from the data storage media) than the capacity data storage hardware.

At 406, a VAT is defined that includes a set of virtual address entries which reference LLPs stored in the capacity data storage tier and, at 408, a tree-structured index is defined that includes a set of index nodes that reference virtual address entries of the VAT. In some examples, the VAT is configured to include an initial quantity of virtual address entries which are allocated to reference LLPs in the capacity data storage tier and/or link index nodes of the tree-structured index in the performance data storage tier to those referenced LLPs in the capacity data storage tier. Further, the VAT is configured to generate or otherwise create additional virtual address entries during operation of the system and such entry generation may be triggered if there are no more free virtual addresses available. Additionally, or alternatively, creation of additional virtual address entries is triggered based on a current quantity and/or percentage of virtual address entries being allocated, in some examples. For instance, if a VAT has 100 entries and a threshold of the VAT is defined at 75%, when 75 of the 100 entries are allocated, the VAT is configured to generate, create, or otherwise claim resources for more virtual address entries to expand the pool of entries that may be used by the VAT (e.g., the VAT may generate 50, 100, or some other quantity of virtual address entries).

Additionally, in some examples, virtual address entries of the VAT are released or freed based on operations of the system, such as operations associated with the index nodes that reference the virtual address entries.

Further, in some examples, the VAT is configured to manage the allocation of the virtual address entries using a sequential allocation index and/or a free entry list as described herein.

At 410, data to be stored is received and, at 412, at least a first portion of metadata associated with the received data is stored in the LLPs using the VAT and at least a second portion of metadata associated with the received data is stored in the performance data storage tier. In some examples, metadata associated with enabling indexing or otherwise locating the received data in the capacity data storage tier are stored in the tree-structured index, in the form of index nodes in that index, in the performance data storage tier. Additionally, or alternatively, other metadata associated with the received data are stored in LLPs in the capacity data storage tier. Further, in some examples, storing the received data and the associated metadata includes processes such as writing data to caches and then flushing that data to the capacity data storage tier as described herein.

Figure 5:
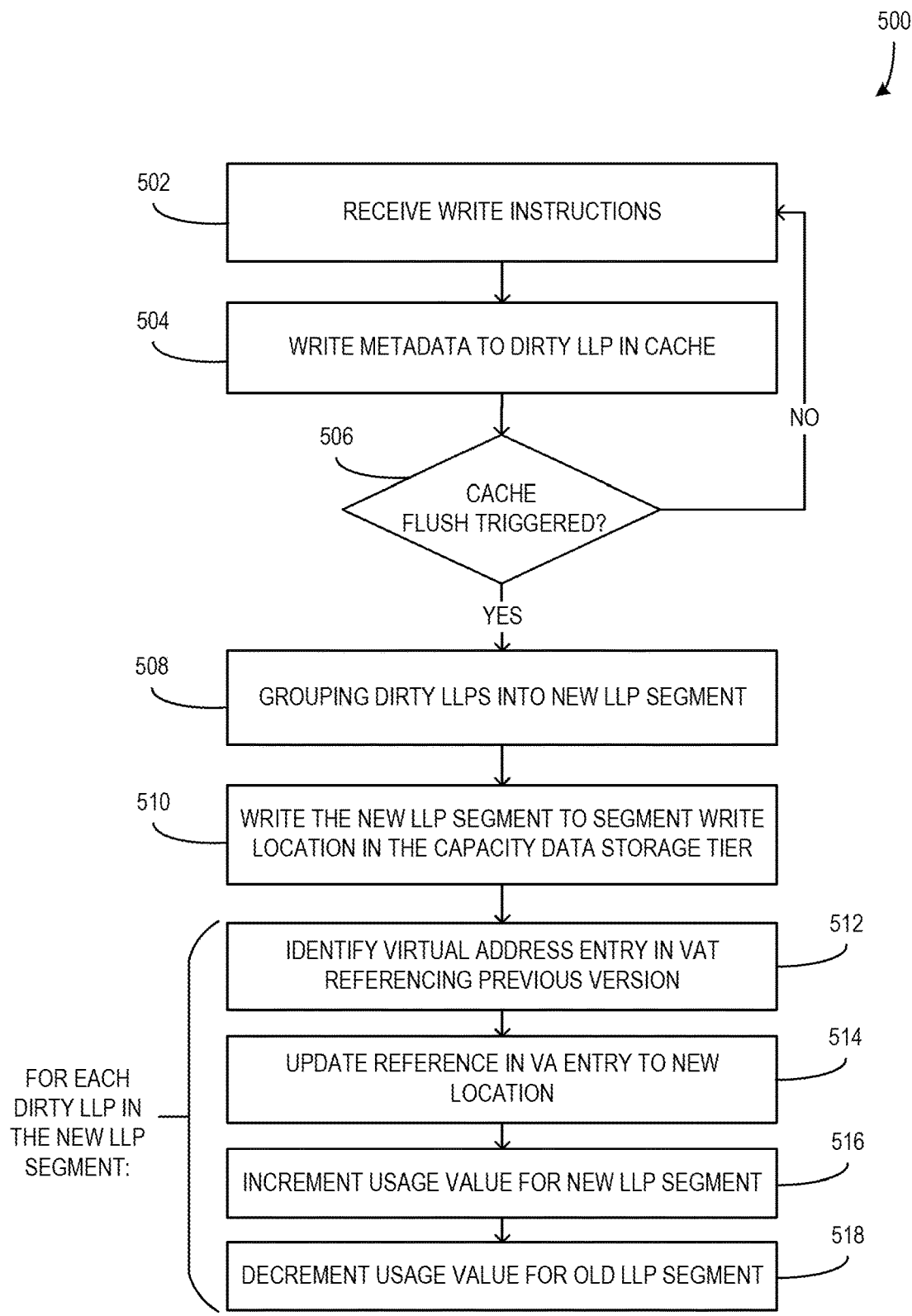
FIG. 5 is a flowchart illustrating a computerized method for flushing a cache to log-structured leaf pages.

FIG. 5 is a flowchart illustrating a computerized method 500 for flushing a cache (e.g., metadata log 124) to log-structured leaf pages (e.g., LLPs 134). In some examples, the method 500 is executed and/or performed by, and/or on, a system such as system 100. At 502, write instructions (e.g., write I/O 108) are received and, at 504, metadata (e.g., metadata 118) associated with the received write instructions are written to a "dirty" LLP in a cache (e.g., compact metadata 126 in the metadata log 124). The dirty LLP is "dirty" to indicate that this version of the LLP is new and should be written to the capacity data storage tier at some point. The dirty LLP is an updated LLP that replaces an older version of the LLP which is stored in the capacity data storage tier or elsewhere, or the dirty LLP is a new LLP that is to be stored in the system for the first time.

In some examples, a group of dirty LLPs is collected in the cache and the cache is stored in the performance data storage tier. Based on new dirty LLPs being written to the cache and/or based on time spent by dirty LLPs in the cache, a cache flush operation is triggered. At 506, if writing the metadata to a dirty LLP in the cache triggers a cache flush, the process proceeds to 508. Alternatively, if writing the metadata to a dirty LLP in the cache does not trigger a cache flush, the process returns to 502 to receive additional write instructions. Additionally, or alternatively, the cache flush is triggered based on dirty LLPs in the cache having been in the cache for more than a defined time period or other threshold. In other examples, other events or states of the cache trigger a cache flush.

Further, it should be understood that, in some examples, the flushing of the cache is performed in an asynchronous way from other operations of the system and/or it is performed by a different process than the write I/O handling process.

At 508, the cache flush is initiated, and the dirty LLPs therein are grouped into a new LLP segment. In some examples, the new LLP segment is created to be a defined size based on requirements and/or configuration of the capacity data storage tier (e.g., the capacity data storage tier is configured to function most efficiently when relatively large sets of data are written to the capacity data storage tier at once).

At 510, the new LLP segment is written to a segment write location in the capacity data storage tier. In some examples, the segment write location is chosen by a segment management system. The segment management system may be configured to try to choose segment write locations sequentially if possible. Such a method of selecting a next segment write location enables the system to efficiently write data to the tier and avoid seeking new segment write locations using other more complex methods.

After the new LLP segment is written to the capacity data storage tier, each dirty LLP in the segment is processed. At 512, for each dirty LLP, a virtual address entry in the VAT is identified that references the previous version of the dirty LLP. Additionally, or alternatively, for a dirty LLP, there may be no previous version if the virtual address has just been allocated.

At 514, for each dirty LLP, the reference to the previous version of the dirty LLP in the identified virtual address entry is updated to reference the dirty LLP in the new LLP segment. In some examples, updating the reference includes changing an offset value in the virtual address entry to equal the offset of the dirty LLP in the new LLP segment. In other examples, other types of references are updated in the virtual address entry without departing from the description.

At 516, for each dirty LLP, a usage value of the new LLP segment is incremented. At 518, for each dirty LLP, a usage value of the old LLP segment that includes the previous version of the dirty LLP is decremented. In some examples, each segment written to the capacity data storage tier includes metadata tracking the current active LLPs therein, such as a usage value that is set to the quantity of current active LLPs. When a new LLP segment is created, in many cases, all or most of the LLPs therein are active and, as a result, the usage value of the new LLP segment is equal to the quantity of active LLPs in the segment. Over time, as some of the LLPs are updated, those previous versions of LLPs in older segments are not considered active anymore and the usage values of those older segments are decremented as described. An LLP segment that has a usage value that is below a threshold is marked for combination with other LLP segments into new and higher usage value segments. In some examples, such a combination process is performed automatically in the system (e.g., in background processes) such that the data space occupied by segments that include largely inactive LLPs can be freed and reused. Further, as a result of such segment combination processes, virtual address entries of the VAT are updated with references to locations in the new combined segments to replace references to older segments.

Figure 6:
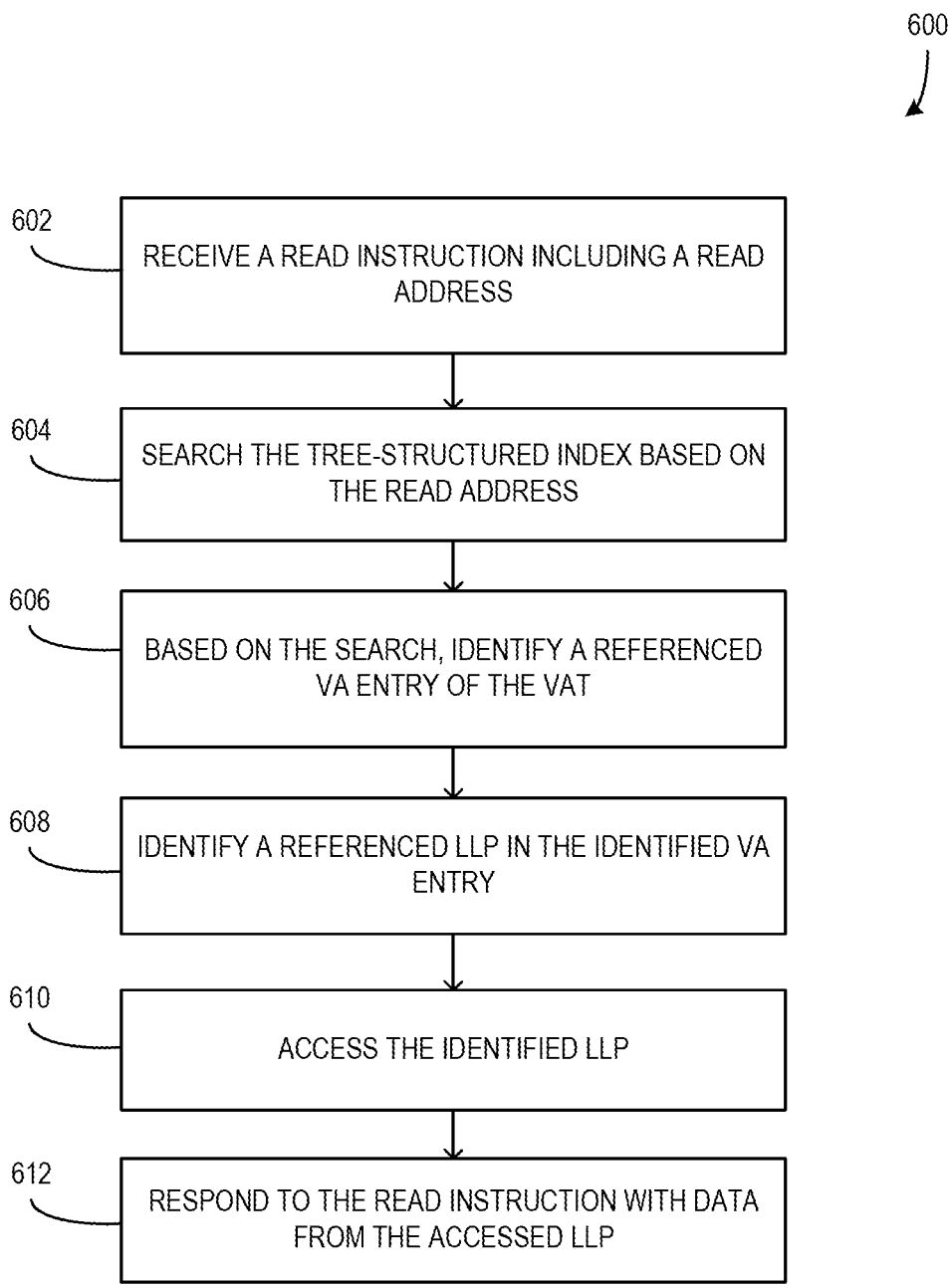
FIG. 6 is a flowchart illustrating a computerized method for reading data from a log-structured leaf page.

FIG. 6 is a flowchart illustrating a computerized method 600 for reading data from a log-structured leaf page (e.g., LLPs 134). In some examples, the method 600 is executed or otherwise performed by and/or on a system such as system 100 of FIG. 1. At 602, a read instruction including a read address is received. The read address of the read instruction is a reference to the address space in which data is stored in the system and that address space is indexed by the tree-structured index of the system.

At 604, the tree-structured index is searched based on the read address and, at 606, based on the search, a reference virtual address entry of the VAT is identified. In some examples, searching the tree-structure index includes traversing the tree structure from a root node to a node on the deepest level of the tree, using the read address to determine which path of the tree structure to follow. Each of the nodes on the deepest level of the tree structure is configured to point to or otherwise reference allocated virtual address entries of the VAT as described herein. In some examples, each allocated virtual address entry is pointed to by one index node of the tree-structured index and each allocated virtual address entry references or otherwise points to one LLP in the capacity data storage tier, such that the virtual address entry acts as a level of abstraction between the LLPs and the index nodes. In other examples, other relationships between index nodes, virtual address entries, and LLPs are defined (e.g., multiple index nodes that point to a single virtual address entry).

At 608, an LLP referenced by the identified virtual address entry is identified. In some examples, the referenced LLP is identified based on an LLP offset value and/or segment identifier stored in the virtual address entry as described herein. In other examples, other methods of referring to the LLP are used.

At 610, the identified LLP is accessed and, at 612, the read instruction is responded to by reference stored in the metadata which are stored in LLP. In some examples, responding to the read instruction also includes accessing a data block in the capacity data storage tier based on one or more references in the metadata stored in the accessed LLP. The data used to respond to the read instruction includes all or part of the accessed LLP.

Figure 7:
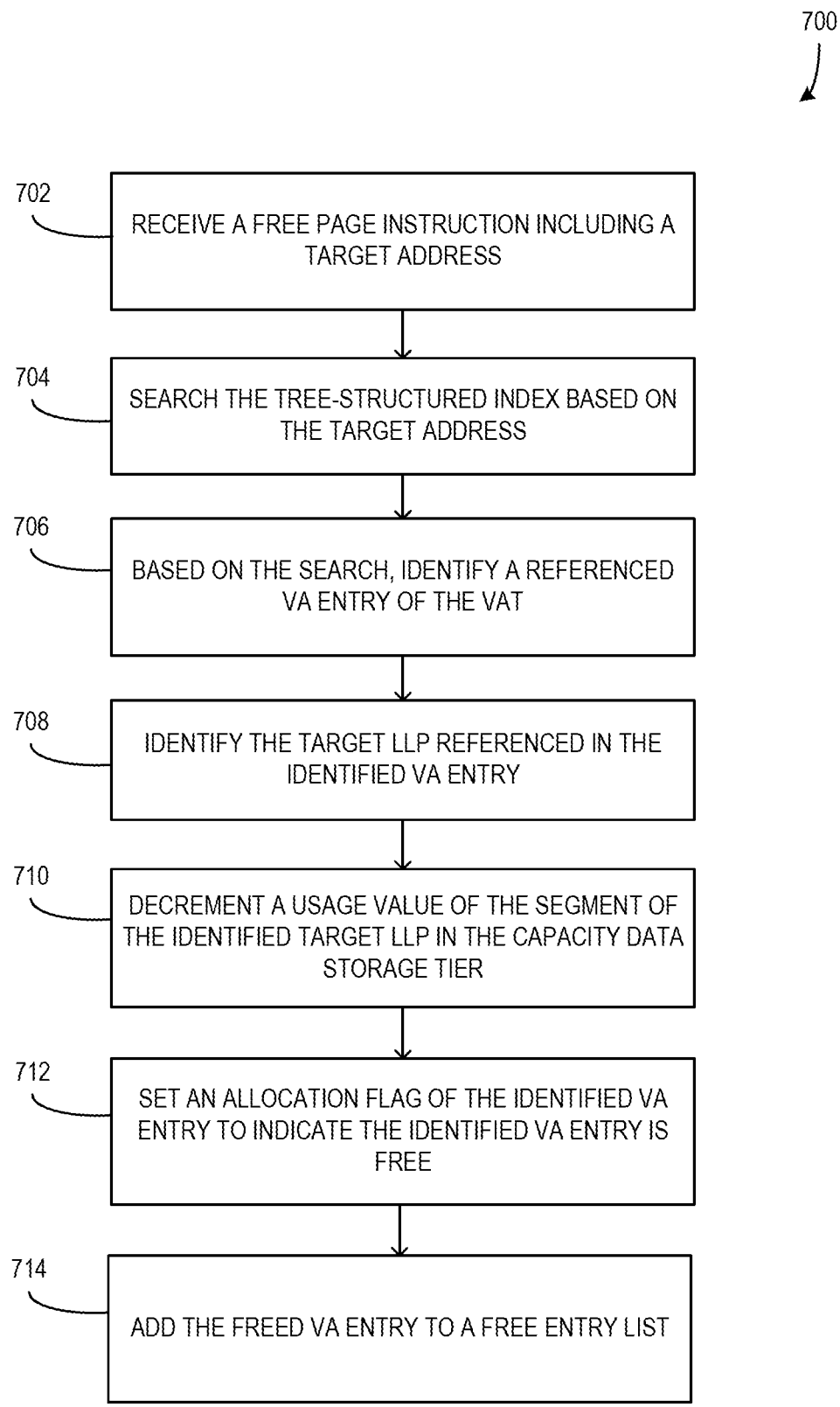
FIG. 7 is a flowchart illustrating a computerized method for freeing a log-structured leaf page.

FIG. 7 is a flowchart illustrating a computerized method 700 for freeing a LLP (e.g., LLPs 134). In some examples, the method 700 is executed or otherwise performed by and/or on a system such as system 100 of FIG. 1. At 702, a free page instruction including a target address is received. Such a free page instruction is received based on some portion of data be deleted or otherwise removed from the system, in some examples.

At 704, the tree-structured index is searched based on the target address and based on the search, at 706, a virtual address entry of the VAT that is referenced by an index node of the tree-structured index is identified. The identified virtual address entry is then used to identify the target LLP in the capacity data storage tier at 708. In some examples, this process of identifying the target LLP is substantially the same as the process of identifying the LLP for reading data as described above with the respect to method 600 of FIG. 6.

At 710, a usage value of the segment of the identified target LLP is decremented. This enables the total usage of the segment reflect that the target LLP has been freed and is no longer active. At 712, an allocation flag of the identified virtual address entry in the VAT is set to indicate that the virtual address entry is free or otherwise not allocated, enabling it to be used for another purpose. Further, in some examples, after the virtual address entry is unallocated, it is added to a free entry list (e.g., free entry list 346) of the VAT such that the VAT can later allocate the entry for use with a different LLP as described herein.

Additional Examples

In an example, a system comprises at least one processor; a set of log-structured leaf pages (LLPs) for storing data and/or metadata of the system; a virtual address table (VAT) including a set of virtual address entries, wherein the virtual address entries include references to the LLPs; and an index data structure that includes references to the set of virtual address entries of the VAT; and at least one memory comprising computer program code, the at least one memory and the computer program code configured to, with the at least one processor, cause the at least one processor to: receive data to be stored in the system; and store at least a first portion of metadata associated with the received data in the LLPs using the VAT and at least a second portion of metadata associated with the received data in the in the index data structure. In such an example, the system does not include two different data storage tiers, but rather implements the described structure without data storage tier limitations.

Further, in this example, the index data structure includes a tree-structured index as described herein. Alternatively, the index data structure includes another type of index without departing from the description.

Additionally, in this example, the storing data in the system includes processes for writing data to the system, processes for flushing data from caches to the index data structure, VAT, and LLPs, processes for reading data from the LLPs, processes for freeing LLPs, and processes for managing the VAT and/or the log structure of the LLPs as described herein.

Exemplary Operating Environment

Figure 8:
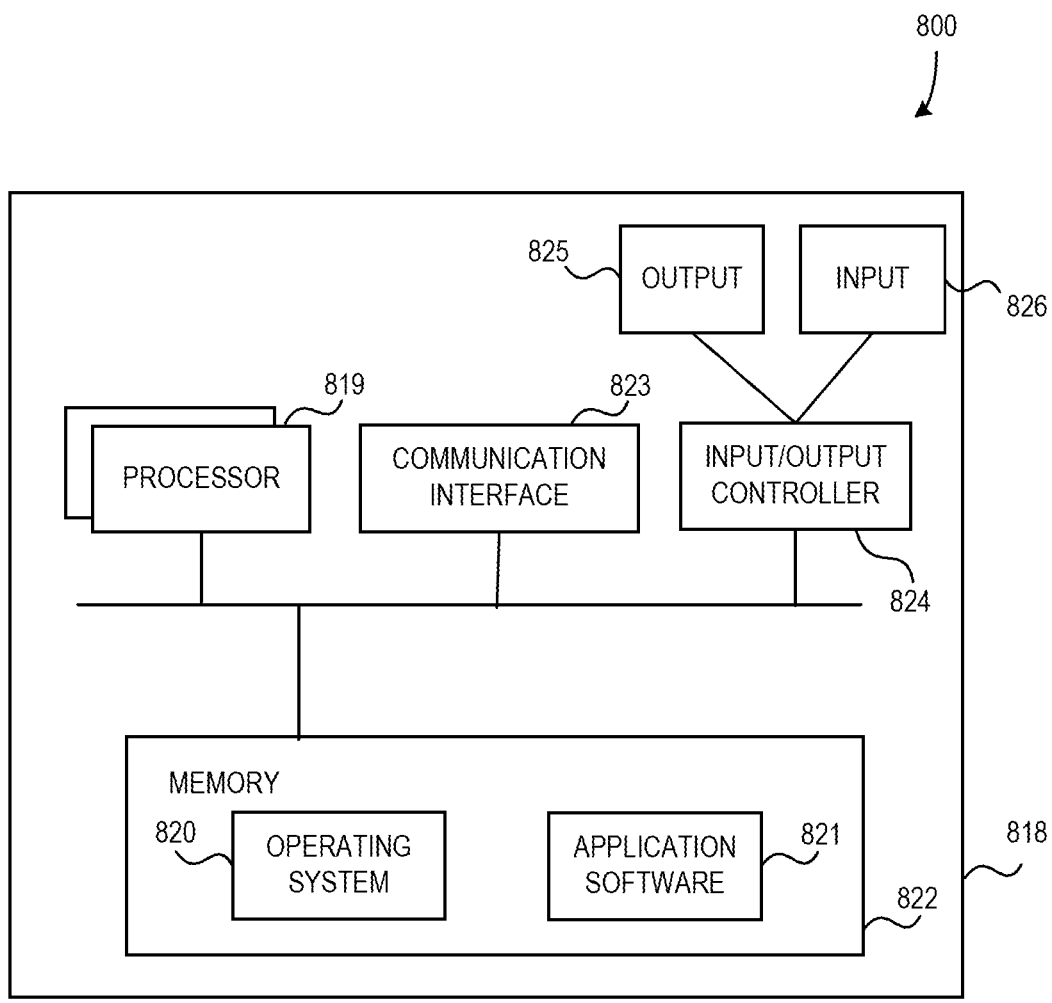
FIG. 8 illustrates a computing apparatus as a functional block diagram.

The present disclosure is operable with a computing apparatus as a functional block diagram 800 in FIG. 8. In an embodiment, components of a computing apparatus 818 may be implemented as a part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hardcoded machine. Platform software comprising an operating system 820 or any other suitable platform software may be provided on the apparatus 818 to enable application software 821 to be executed on the device. According to an embodiment, storing and managing data in log-structured leaf pages using a VAT on a two-tier data storage system as described herein may be accomplished by software, hardware, and/or firmware.

Computer executable instructions may be provided using any computer-readable media that are accessible by the computing apparatus 818. Computer-readable media may include, for example, computer storage media such as a memory 822 and communications media. Computer storage media, such as a memory 822, include volatile and nonvolatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g., using a communication interface 823).

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone, or a touchpad. In one embodiment, the output device 825 may also act as the input device. An example of such a device may be a touch sensitive display. The input/output controller 824 may also output data to devices other than the output device, e.g., a locally connected printing device. In some embodiments, a user may provide input to the input device(s) 826 and/or receive output from the output device (s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for storing data using a capacity data storage tier and a performance data storage tier comprises: at least one processor; a capacity data storage tier including capacity data storage hardware configured to store log-structured leaf pages (LLPs); a performance data storage tier including performance data storage hardware; a virtual address table (VAT) including a set of virtual address entries, wherein the virtual address entries include references to the LLPs; and a tree-structured index including a set of index nodes, wherein a subset of index nodes of the tree-structured index include references to the set of virtual address entries of the VAT, wherein the performance data storage hardware has a lower data storage capacity than the capacity data storage hardware, and the performance data storage hardware has a faster data rate than the capacity data storage hardware; and at least one memory comprising computer program code, the at least one memory and the computer program code configured to, with the processor, cause the processor to: receive data to be stored in the system; and store (i) at least a first portion of metadata associated with the received data in the LLPs using the VAT and (ii) at least a second portion of metadata associated with the received data in the performance data storage tier.

An example method for storing data using a capacity data storage tier and a performance data storage tier comprises: connecting, by at least one processor, to a capacity data storage tier including capacity data storage hardware configured to store log-structured leaf pages (LLPs); connecting, by the processor, to a performance data storage tier including performance data storage hardware; generating, by the processor, a virtual address table (VAT) including a set of virtual address entries, wherein the virtual address entries include references to the LLPs; creating, by the processor, a tree-structured index including a set of index nodes, wherein a subset of index nodes of the tree-structured index includes references to the set of virtual address entries of the VAT; receiving, by the processor, data to be stored; and storing, by the processor, (i) at least a first portion of metadata associated with the received data in the LLPs using the VAT and (ii) at least a second portion of metadata associated with the received data in the performance data storage tier; wherein the performance data storage hardware has a lower data storage capacity than the capacity data storage hardware, and the performance data storage hardware has a faster data rate than the capacity data storage hardware.

One or more computer storage media have computer-executable instructions for storing data using a capacity data storage tier and a performance data storage tier that, upon execution by a processor, cause the processor to at least: connect to a capacity data storage tier including capacity data storage hardware configured to store log-structured leaf pages (LLPs); connect to a performance data storage tier including performance data storage hardware; generate a virtual address table (VAT) including a set of virtual address entries, wherein the virtual address entries include references to the LLPs; create a tree-structured index including a set of index nodes, wherein a subset of index nodes of the tree-structured index include references to the set of virtual address entries of the VAT; receive data to be stored; and store (i) at least a first portion of metadata associated with the received data in the LLPs using the VAT and (ii) at least a second portion of metadata associated with the received data in the performance data storage tier, wherein the performance data storage hardware has a lower data storage capacity than the capacity data storage hardware, and the performance data storage hardware has a faster data rate than the capacity data storage hardware.

Alternatively, or in addition to the other examples described herein, examples include any combination of the following:

further comprising: storing, by the processor, a set of dirty LLPs in a cache in the performance data storage tier based on the received data; detecting, by the processor, a flush operation trigger associated with the cache; grouping, by the processor, the set of dirty LLPs into a new LLP segment based on the detected flush operation trigger;

writing, by the processor, the new LLP segment to the capacity data storage tier; for each dirty LLP in the new LLP segment: identifying, by the processor, a virtual address entry in the VAT that includes a reference to a previous version of the dirty LLP; updating, by the processor, the reference in the identified virtual address entry to a location of the dirty LLP in the new LLP segment; incrementing, by the processor, a usage value for the new LLP segment; and decrementing, by the processor, a usage value of a segment in which the previous version of the dirty LLP is stored.

further comprising: receiving, by the processor, a write instruction including write data and a target write address; performing, by the processor, a write operation on a dirty LLP in the cache based on the write data and target write address of the received write instruction, wherein performing the write operation on the dirty LLP causes the flush operation trigger.

further comprising: receiving, by the processor, a read instruction including a read address; searching, by the processor, the tree-structured index based on the read address; identifying, by the processor, a referenced virtual address entry of the VAT; identifying, by the processor, a referenced LLP in the identified virtual address entry; accessing, by the processor, the identified LLP; and responding, by the processor, to the read instruction with data from the accessed LLP.

further comprising: receiving, by the processor, a free page instruction including a target address of a target LLP to be freed; searching, by the processor, the tree-structured index based on the target address; identifying, by the processor, a referenced virtual address entry of the VAT; identifying, by the processor, the target LLP referenced in the identified virtual address entry; decrementing, by the processor, a usage value of a segment of the identified target LLP in the capacity data storage tier; and setting, by the processor, an allocation flag of the identified virtual address entry to indicate that the identified virtual address entry is free.

further comprising: receiving, by the processor, a virtual address entry allocation request; based on a sequential allocation index of the VAT including a virtual address in a valid virtual address range: identifying, by the processor, a first virtual address entry using the virtual address included in the sequential allocation index; setting, by the processor, an allocation flag of the identified first virtual address entry to indicate that the identified first virtual address entry is allocated; providing, by the processor, the identified first virtual address entry in response to the virtual address entry allocation request; increment the sequential allocation index to a next virtual address; based on the sequential allocation index including a virtual address outside the valid virtual address range: identifying, by the processor, a first virtual address entry in a free entry list of the VAT; setting, by the processor, an allocation flag of the identified first virtual address entry to indicate that the identified first virtual address entry is allocated; providing, by the processor, the identified first virtual address entry in response to the virtual address entry allocation request; identifying, by the processor, a second virtual address entry to which the identified first virtual address entry is linked; removing, by the processor, the identified first virtual address entry from the free entry list; and setting, by the processor, the second virtual address entry as a new first virtual address entry in the free entry list.

further comprising: detecting, by the processor, location changes of a portion of LLPs in the capacity data storage tier; updating, by the processor, references to the portion of LLPs in the set of virtual address entries of the VAT to reference new locations of the portion of LLPs, wherein a state of the tree-structured index is maintained throughout the detected location changes of the portion of LLPs.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for connecting, by at least one processor, to a capacity data storage tier including capacity data storage hardware configured to store log-structured leaf pages (LLPs); exemplary means for connecting, by the processor, to a performance data storage tier including performance data storage hardware; exemplary means for generating, by the processor, a virtual address table (VAT) including a set of virtual address entries, wherein the virtual address entries include references to the LLPs; exemplary means for creating, by the processor, a tree-structured index including a set of index nodes, wherein a subset of index nodes of the tree-structured index includes references to the set of virtual address entries of the VAT; exemplary means for receiving, by the processor, data to be stored; and exemplary means for storing, by the processor, (i) at least a first portion of metadata associated with the received data in the LLPs using the VAT and (ii) at least a second portion of metadata associated with the received data in the performance data storage tier; wherein the performance data storage hardware has a lower data storage capacity than the capacity data storage hardware, and the performance data storage hardware has a faster data rate than the capacity data storage hardware.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method performed by at least one processor, the method comprising:
    connecting to a capacity data storage tier including capacity data storage hardware configured to store log-structured leaf pages (LLPs);
    connecting to a performance data storage tier including performance data storage hardware;
    generating a virtual address table (VAT) including a set of virtual address entries, wherein the virtual address entries include references to the LLPs;
    creating a tree-structured index including a set of index nodes, wherein a subset of index nodes of the tree-structured index includes references to the set of virtual address entries of the VAT, the VAT and the tree-structured index being stored in the performance data storage tier;
    receiving data to be stored; and
    storing (i) at least a first portion of metadata associated with the received data in the LLPs in the capacity data storage tier using the VAT and (ii) at least a second portion of the metadata associated with the received data in the performance data storage tier;
    wherein the performance data storage hardware has a lower data storage capacity than the capacity data storage hardware, and the performance data storage hardware has a faster data rate than the capacity data storage hardware.

2. The method of claim 1, further comprising:
    storing a set of dirty LLPs in a cache in the performance data storage tier based on the received data;
    detecting a flush operation trigger associated with the cache;
    grouping the set of dirty LLPs into a new LLP segment based on the detected flush operation trigger;
    writing the new LLP segment to the capacity data storage tier; and
    for each dirty LLP in the new LLP segment:
        identifying a virtual address entry in the VAT that includes a reference to a previous version of the dirty LLP;
        updating the reference in the identified virtual address entry to a location of the dirty LLP in the new LLP segment;
        incrementing a usage value for the new LLP segment; and
        decrementing a usage value of a segment in which the previous version of the dirty LLP is stored.

3. The method of claim 2, further comprising:
    receiving a write instruction including write data and a target write address; and
    performing a write operation on a dirty LLP in the cache based on the write data and target write address of the received write instruction,
    wherein performing the write operation on the dirty LLP causes the flush operation trigger.

4. The method of claim 1, further comprising:
    receiving a read instruction including a read address;
    searching the tree-structured index based on the read address;
    identifying a referenced virtual address entry of the VAT;
    identifying a referenced LLP in the identified virtual address entry;
    accessing the identified LLP; and
    responding to the read instruction with data from the accessed LLP.

5. The method of claim 1, further comprising:
    receiving a free page instruction including a target address of a target LLP to be freed;
    searching the tree-structured index based on the target address;
    identifying a referenced virtual address entry of the VAT;
    identifying the target LLP referenced in the identified virtual address entry;
    decrementing a usage value of a segment of the identified target LLP in the capacity data storage tier; and
    setting an allocation flag of the identified virtual address entry to indicate that the identified virtual address entry is free.

6. The method of claim 1, further comprising:
    receiving a virtual address entry allocation request;
    based on a sequential allocation index of the VAT including a virtual address in a valid virtual address range:
        identifying a first virtual address entry using the virtual address included in the sequential allocation index;
        setting an allocation flag of the identified first virtual address entry to indicate that the identified first virtual address entry is allocated;
        providing the identified first virtual address entry in response to the virtual address entry allocation request; and
        increment the sequential allocation index to a next virtual address; and
    based on the sequential allocation index including a virtual address outside the valid virtual address range:
        identifying a first virtual address entry in a free entry list of the VAT;
        setting an allocation flag of the identified first virtual address entry to indicate that the identified first virtual address entry is allocated;
        providing the identified first virtual address entry in response to the virtual address entry allocation request;
        identifying a second virtual address entry to which the identified first virtual address entry is linked;
        removing the identified first virtual address entry from the free entry list; and
        setting the second virtual address entry as a new first virtual address entry in the free entry list.

7. The method of claim 1,
    wherein the metadata is used to identify, classify, or describe the received data, and
    wherein the second portion is different from the first portion.

8. A system comprising:
    at least one processor;
    a capacity data storage tier including capacity data storage hardware configured to store log-structured leaf pages (LLPs);
    a performance data storage tier including performance data storage hardware;
    a virtual address table (VAT) including a set of virtual address entries, wherein the virtual address entries include references to the LLPs;
    a tree-structured index including a set of index nodes, wherein a subset of index nodes of the tree-structured index includes references to the set of virtual address entries of the VAT, the VAT and the tree-structured index being stored in the performance data storage tier;
    wherein the performance data storage hardware has a lower data storage capacity than the capacity data storage hardware, and the performance data storage hardware has a faster data rate than the capacity data storage hardware; and at least one memory comprising computer program code, the at least one memory and the computer program code configured to, with the at least one processor, cause the at least one processor to:

receive data to be stored in the system; and store (i) at least a first portion of metadata associated with the received data in the LLPs in the capacity data storage tier using the VAT and (ii) at least a second portion of the metadata associated with the received data in the performance data storage tier.

9. The system of claim 8, wherein the at least one memory and the computer program code are configured to, with the at least one processor, further cause the at least one processor to:

store a set of dirty LLPs in a cache in the performance data storage tier based on the received data;

detect a flush operation trigger associated with the cache;

group the set of dirty LLPs into a new LLP segment based on the detected flush operation trigger;

write the new LLP segment to the capacity data storage tier; and for each dirty LLP in the new LLP segment:
identify a virtual address entry in the VAT that includes a reference to a previous version of the dirty LLP;
update the reference in the identified virtual address entry to a location of the dirty LLP in the new LLP segment;
increment a usage value for the new LLP segment; and
decrement a usage value of a segment in which the previous version of the dirty LLP is stored.

10. The system of claim 9, wherein the at least one memory and the computer program code are configured to, with the at least one processor, further cause the at least one processor to:

receive a write instruction including write data and a target write address; and perform a metadata update operation on a dirty LLP in the cache based on the write data and target write address of the received write instruction, wherein performing the metadata update operation on the dirty LLP causes the flush operation trigger.

11. The system of claim 8, wherein the VAT is an abstraction layer, an indirection layer, or a translation layer between the LLPs and the subset of index nodes of the tree-structured index, wherein the at least one memory and the computer program code are configured to, with the at least one processor, further cause the at least one processor to:

receive a read instruction including a read address;
search the tree-structured index based on the read address;
identify a referenced virtual address entry of the VAT;
identify a referenced LLP in the identified virtual address entry;
access the identified LLP; and
respond to the read instruction with data by referencing metadata stored in the accessed LLP.

12. The system of claim 8, wherein the at least one memory and the computer program code are configured to, with the at least one processor, further cause the at least one processor to:

receive a free page instruction including a target address of a target LLP to be freed;
search the tree-structured index based on the target address;
identify a referenced virtual address entry of the VAT;
identify the target LLP referenced in the identified virtual address entry;
decrement a usage value of a segment of the identified target LLP in the capacity data storage tier; and
set an allocation flag of the identified virtual address entry to indicate that the identified virtual address entry is free.

13. The system of claim 8, wherein the at least one memory and the computer program code are configured to, with the at least one processor, further cause the at least one processor to:

receive a virtual address entry allocation request;
based on a sequential allocation index of the VAT including a virtual address in a valid virtual address range:
identify a first virtual address entry using the virtual address included in the sequential allocation index;
set an allocation flag of the identified first virtual address entry to indicate that the identified first virtual address entry is allocated;
provide the identified first virtual address entry in response to the virtual address entry allocation request; and
increment the sequential allocation index to a next virtual address; and
based on the sequential allocation index including a virtual address outside the valid virtual address range:
identify a first virtual address entry in a free entry list of the VAT;
set an allocation flag of the identified first virtual address entry to indicate that the identified first virtual address entry is allocated;
provide the identified first virtual address entry in response to the virtual address entry allocation request;
identify a second virtual address entry to which the identified first virtual address entry is linked;
remove the identified first virtual address entry from the free entry list; and
set the second virtual address entry as a new first virtual address entry in the free entry list.

14. The system of claim 8, wherein the at least one memory and the computer program code are configured to, with the at least one processor, further cause the at least one processor to:

detect location changes of a portion of LLPs in the capacity data storage tier; and
update references to the portion of LLPs in the set of virtual address entries of the VAT to reference new locations of the portion of LLPs,
wherein a state of the tree-structured index is maintained throughout the detected location changes of the portion of LLPs.

15. One or more computer storage media having computer-executable instructions that, upon execution by a processor, cause the processor to at least:

connect to a capacity data storage tier including capacity data storage hardware configured to store log-structured leaf pages (LLPs);
connect to a performance data storage tier including performance data storage hardware;
generate a virtual address table (VAT) including a set of virtual address entries, wherein the virtual address entries include references to the LLPs;
create a tree-structured index including a set of index nodes, wherein a subset of index nodes of the tree-structured index includes references to the set of virtual address entries of the VAT, the VAT and the tree-structured index being stored in the performance data storage tier;

receive data to be stored; and store (i) at least a first portion of metadata associated with the received data in the LLPs in the capacity data storage tier using the VAT and (ii) at least a second portion of the metadata associated with the received data in the performance data storage tier, wherein the performance data storage hardware has a lower data storage capacity than the capacity data storage hardware, and the performance data storage hardware has a faster data rate than the capacity data storage hardware.

16. The one or more computer storage media of claim 15, wherein the computer-executable instructions, upon execution by a processor, further cause the processor to at least:

store a set of dirty LLPs in a cache in the performance data storage tier based on the received data;

detect a flush operation trigger associated with the cache;

group the set of dirty LLPs into a new LLP segment based on the detected flush operation trigger;

write the new LLP segment to the capacity data storage tier; and for each dirty LLP in the new LLP segment:
identify a virtual address entry in the VAT that includes a reference to a previous version of the dirty LLP;
update the reference in the identified virtual address entry to a location of the dirty LLP in the new LLP segment;
increment a usage value for the new LLP segment; and
decrement a usage value of a segment in which the previous version of the dirty LLP is stored.

17. The one or more computer storage media of claim 16, wherein the computer-executable instructions, upon execution by a processor, further cause the processor to at least:

receive a write instruction including write data and a target write address; and perform a metadata update operation on a dirty LLP in the cache based on the write data and target write address of the received write instruction, wherein performing the metadata update operation on the dirty LLP causes the flush operation trigger.

18. The one or more computer storage media of claim 15, wherein the computer-executable instructions, upon execution by a processor, further cause the processor to at least:

receive a read instruction including a read address;

search the tree-structured index based on the read address;

identify a referenced virtual address entry of the VAT;

identify a referenced LLP in the identified virtual address entry;

access the identified LLP; and respond to the read instruction with data by referencing metadata in the accessed LLP.

19. The one or more computer storage media of claim 15, wherein the computer-executable instructions, upon execution by a processor, further cause the processor to at least:

receive a free page instruction including a target address of a target LLP to be freed;

identify a referenced virtual address entry of the VAT;

identify the target LLP referenced in the identified virtual address entry;

decrement a usage value of a segment of the identified target LLP in the capacity data storage tier; and set an allocation flag of the identified virtual address entry to indicate that the identified virtual address entry is free.

20. The one or more computer storage media of claim 15, wherein the computer-executable instructions, upon execution by a processor, further cause the processor to at least:

receive a virtual address entry allocation request;

based on a sequential allocation index of the VAT including a virtual address in a valid virtual address range:
identify a first virtual address entry using the virtual address included in the sequential allocation index;
set an allocation flag of the identified first virtual address entry to indicate that the identified first virtual address entry is allocated;
provide the identified first virtual address entry in response to the virtual address entry allocation request; and
increment the sequential allocation index to a next virtual address; and based on the sequential allocation index including a virtual address outside the valid virtual address range:
identify a first virtual address entry in a free entry list of the VAT;
set an allocation flag of the identified first virtual address entry to indicate that the identified first virtual address entry is allocated;
provide the identified first virtual address entry in response to the virtual address entry allocation request;
identify a second virtual address entry to which the identified first virtual address entry is linked;
remove the identified first virtual address entry from the free entry list; and
set the second virtual address entry as a new first virtual address entry in the free entry list.

* * * * *